US010464457B1

(12) United States Patent
Doan et al.

(10) Patent No.: US 10,464,457 B1
(45) Date of Patent: Nov. 5, 2019

(54) VEHICLE DOOR ARMREST SUBSTRATE HAVING INTEGRAL HIGH RETENTION FASTENER

(71) Applicant: Ford Global Technologies, LLC, Dearborn, MI (US)

(72) Inventors: Linh Doan, Belleville, MI (US); Bhavani Thota, Novi, MI (US); Amit Chakravarty, Warren, MI (US); Nitesh Jadhav, Canton, MI (US); Ryan Mowery, Albion, MI (US); Daniel Morin, Southgate, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 58 days.

(21) Appl. No.: 15/968,899

(22) Filed: May 2, 2018

(51) Int. Cl.
   *B60N 2/75* (2018.01)
   *B62D 65/14* (2006.01)
   *B60R 13/02* (2006.01)

(52) U.S. Cl.
   CPC ............ *B60N 2/78* (2018.02); *B60R 13/0237* (2013.01); *B62D 65/14* (2013.01)

(58) Field of Classification Search
   CPC ........ B60N 2/78; B60N 2/77; B60R 13/0237; B62D 65/14
   USPC ......................................................... 296/153
   See application file for complete search history.

(56) References Cited

U.S. PATENT DOCUMENTS

| | | | |
|---|---|---|---|
| 2,038,033 A * | 4/1936 | Flynn ...................... | E05B 85/12 296/153 |
| 2,565,211 A * | 8/1951 | Doty ........................ | B60N 2/78 297/411.21 |
| 3,004,586 A * | 10/1961 | Bushong .................. | B60N 2/78 297/411.21 |
| 4,867,500 A | 9/1989 | Oosterbaan et al. | |
| 4,919,470 A * | 4/1990 | Muller ...................... | B60J 5/042 296/153 |
| 5,180,089 A | 1/1993 | Suman et al. | |
| 5,203,604 A * | 4/1993 | Emley, Jr. .............. | B60N 2/783 296/153 |
| 5,507,545 A * | 4/1996 | Krysiak ................... | B60J 3/023 24/453 |
| 5,803,415 A * | 9/1998 | Konishi .................... | B60N 2/78 248/118 |
| 5,893,601 A * | 4/1999 | Carlberg ................. | B60N 2/783 296/153 |
| 5,951,094 A | 9/1999 | Konishi et al. | |
| 6,695,387 B1 | 2/2004 | Gordon | |
| 7,108,311 B2 * | 9/2006 | Dooley .................... | B29C 39/10 264/275 |

(Continued)

FOREIGN PATENT DOCUMENTS

| | | | | |
|---|---|---|---|---|
| CN | 105034893 | 11/2015 | | |
| CN | 206900265 | 1/2018 | | |
| EP | 1177938 A1 * | 2/2002 | ........... | B60N 2/5841 |

*Primary Examiner* — Pinel E Romain
(74) *Attorney, Agent, or Firm* — Vichit Chea; Price Heneveld LLP (57) ABSTRACT

A vehicle door includes an inner door liner having a substrate receptacle. An armrest substrate has a plurality of posts extending through the inner door liner at the substrate receptacle. The substrate receptacle has a plurality of one-way apertures that receive the plurality of posts. Integral retaining features positioned at an end of each post maintains engagement of each post within each respective one-way aperture.

20 Claims, 7 Drawing Sheets

(56) References Cited

U.S. PATENT DOCUMENTS

| | | | |
|---|---|---|---|
| 7,121,611 B2 | 10/2006 | Hirotani et al. | |
| 7,347,470 B2 * | 3/2008 | Steelman | B60J 5/0468 |
| | | | 296/1.09 |
| 7,503,621 B2 | 3/2009 | Mani | |
| 7,681,939 B2 | 3/2010 | Augustyn | |
| 8,083,283 B2 * | 12/2011 | Bailey | B60N 2/78 |
| | | | 296/153 |
| 10,059,294 B1 * | 8/2018 | Tay | B60R 21/0428 |
| 10,081,283 B2 * | 9/2018 | Jayasuriya | B60N 2/78 |
| 10,207,614 B1 * | 2/2019 | Faruque | B60N 2/777 |
| 10,259,367 B2 * | 4/2019 | Han | B60R 21/055 |
| 10,308,151 B2 * | 6/2019 | Memetla Martinez | B60N 2/75 |
| 2007/0200417 A1 * | 8/2007 | York | A47C 7/18 |
| | | | 297/452.55 |

* cited by examiner

VEHICLE DOOR ARMREST SUBSTRATE HAVING INTEGRAL HIGH RETENTION FASTENER

FIELD OF THE INVENTION

The present invention generally relates to vehicle doors, and more specifically, a vehicle door armrest having an armrest substrate that includes an integral retaining feature for connecting to a separate portion of the vehicle door.

BACKGROUND OF THE INVENTION

Within conventional vehicles, the manufacturer of the vehicle door includes attaching an armrest substrate to other structural portions of the vehicle door. These attachments are typically designed to resist side impact loads so that the armrest substrate does not become detached from the remainder of the vehicle door. Additionally, the attachment methods that engage the armrest substrate to the vehicle door have sufficient integrity so that significant breakage does not occur during impact conditions.

SUMMARY OF THE INVENTION

According to one aspect of the present invention, a vehicle door includes an inner door liner having a substrate receptacle. An armrest substrate has a plurality of posts extending through the inner door liner at the substrate receptacle. The substrate receptacle has a plurality of one-way apertures that receive the plurality of posts. Integral retaining features positioned at an end of each post maintains engagement of each post within each respective one-way aperture.

Embodiments of this aspect of the invention can include any one or combination of the following features:
  each one-way aperture of the plurality of one-way apertures includes at least one angled flange that is adapted to flex in an insertion direction to receive the integral retaining feature of a respective post
  the at least one angled flange includes a plurality of radial flanges that flex in the insertion direction
  the plurality of radial flanges are positioned to resist flexion in a removal direction
  flexion of the plurality of radial flanges in the removal direction causes abutting engagement between the plurality of radial flanges with the respective post disposed within the one-way aperture
  the at least one angled flange is a generally conical member having a plurality of flexion slots that permit operation of the conical member in an insertion direction, wherein the plurality of flexion slots are positioned to resist movement in a removal direction, wherein the removal direction is generally opposite to the insertion direction
  the at least one angled flange includes a central aperture that surrounds the respective post
  the central aperture has a diameter that is substantially equal to a thickness of the respective post
  the plurality of posts are integrally formed as part of the armrest substrate
  the plurality of posts and the armrest substrate are injection molded as a single member
  the armrest substrate includes a central gap, and wherein an armrest structure is disposed within the central gap of the armrest substrate
  the armrest substrate is coupled to the substrate receptacle free of additional fasteners According to another aspect of the present invention, a vehicle armrest includes an armrest substrate having a retention post with a retaining feature positioned at an end thereof. An inner door liner has a one-way aperture that receives the retention post. An angled flange of the one-way aperture allows passage of the retaining feature in an insertion direction to an installed position and prevents movement of the retaining feature away from the installed position.

Embodiments of this aspect of the invention can include any one or combination of the following features:
  the one-way aperture is part of a plurality of one-way apertures, wherein the plurality of one-way apertures define a substrate receptacle of the inner door liner
  the retention post is one of a plurality of retention posts that correspondingly engage the plurality of one-way apertures to define the installed position
  the installed position is defined by the plurality of retention posts engaging the plurality of one-way apertures, respectively, wherein the installed position is free of additional fasteners
  the angled flange is a generally conical member having a plurality of flexion slots that permit operation of the conical member in the insertion direction, wherein the plurality of flexion slots are positioned to resist movement of the conical member in a removal direction, wherein the removal direction is generally opposite to the insertion direction
  the angled flange includes a central aperture that surrounds the retention post According to another aspect of the invention, a method of installing a vehicle armrest includes positioning an armrest substrate having a retaining post proximate a substrate receptacle of an inner door liner. The retaining post is moved toward a respective one-way aperture of the substrate receptacle. A retaining feature is pushed through the one-way aperture in an insertion direction. Movement of the retaining feature through the one-way aperture biases radial flanges of the respective one-way aperture in a generally outward direction. The retaining feature is moved through the respective one-way aperture to an installed position, wherein the radial flanges in the installed position are biased in a generally inward direction and toward the retaining post.

Embodiments of this aspect of the invention can include any one or combination of the following features:
  the radial flanges are defined by a plurality of flexion slots defined within a generally conical member and wherein the conical member protrudes from the inner door liner in the insertion direction These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
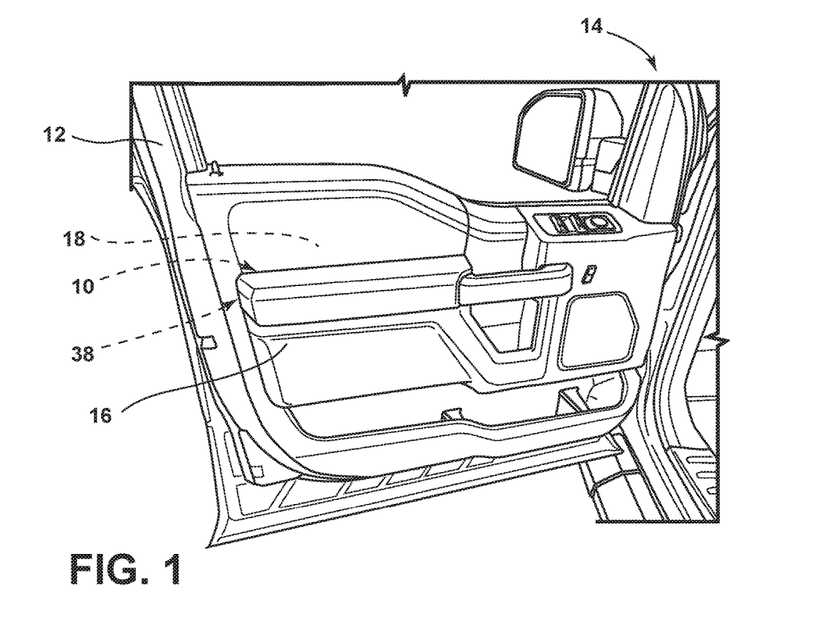
FIG. 1 is a side perspective view of a vehicle door disposed in an open position.
Figure 2:
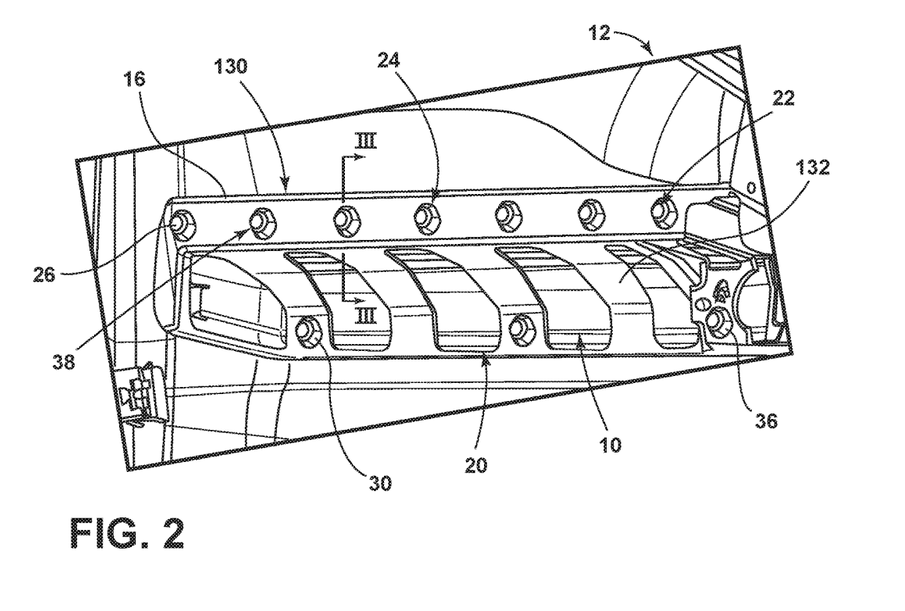
FIG. 2 is a rear perspective view of an inner door liner having an aspect of the armrest substrate attached to the substrate receptacle of the inner door liner.
Figure 3:
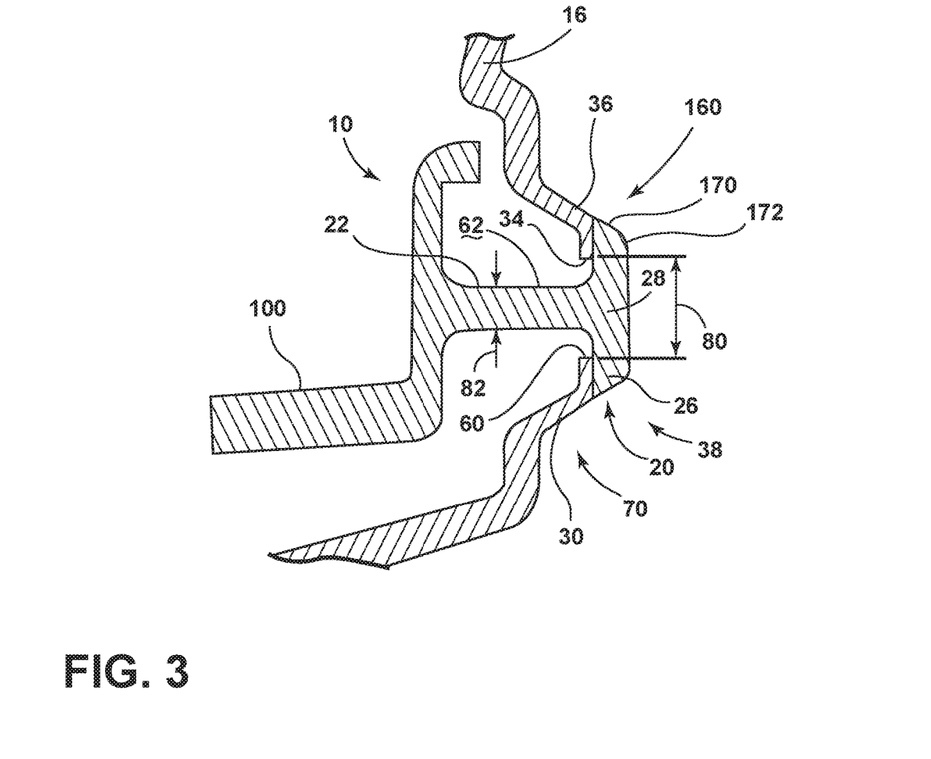
FIG. 3 is a cross-sectional view of the inner door liner of FIG. 2 taken along
Figure 4:
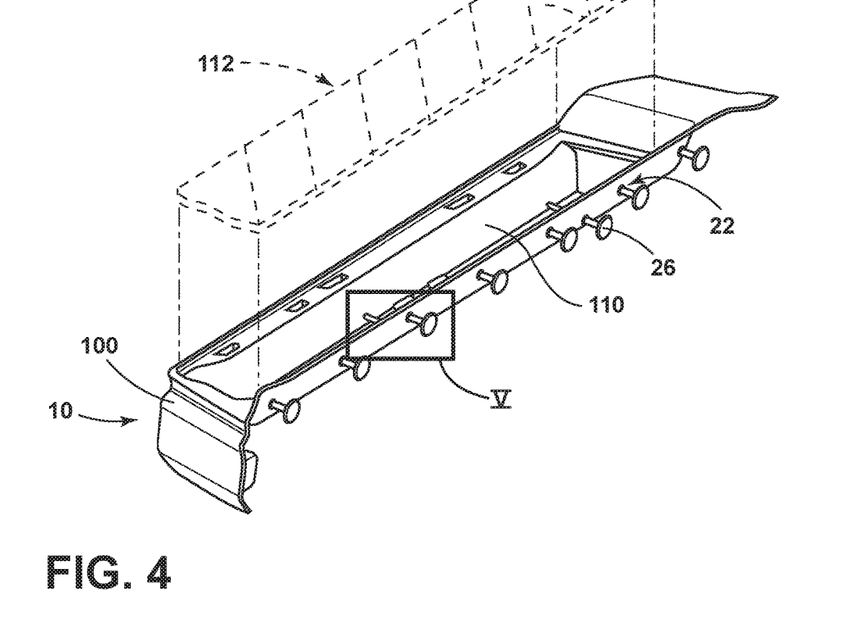
FIG. 4 is a top perspective view of an aspect of the armrest substrate incorporating the plurality of posts having the integral retaining features.
Figure 5:
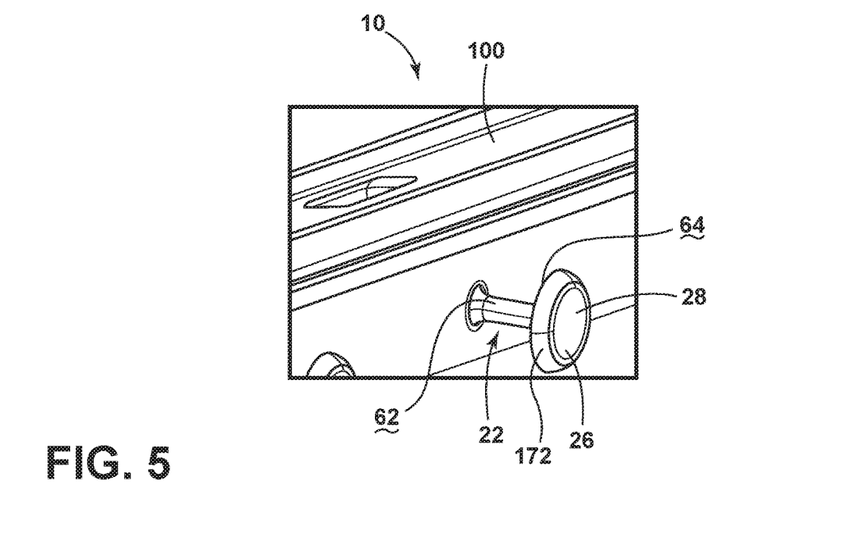
FIG. 5 is an enlarged perspective view of the armrest substrate of FIG. 4 taken at area V.
Figure 6:
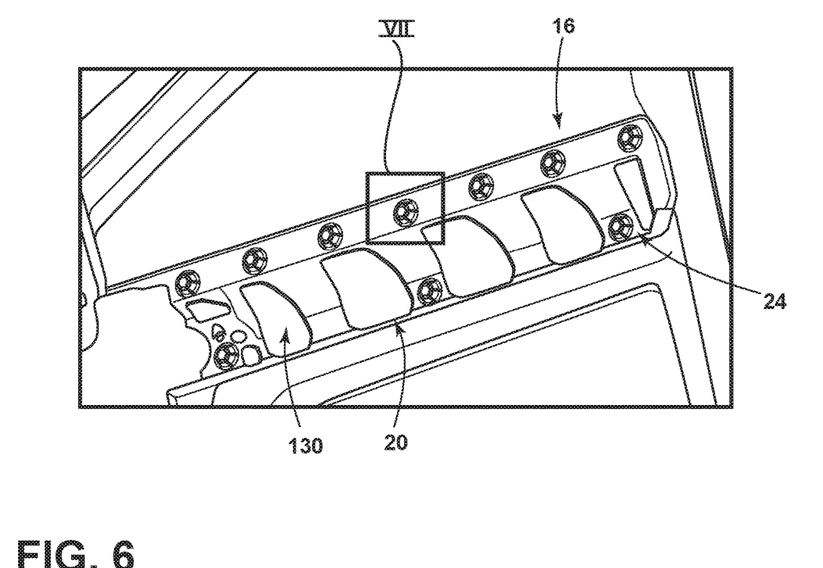
FIG. 6 is a perspective view of an aspect of the substrate receptacle of the inner door liner.
Figure 7:
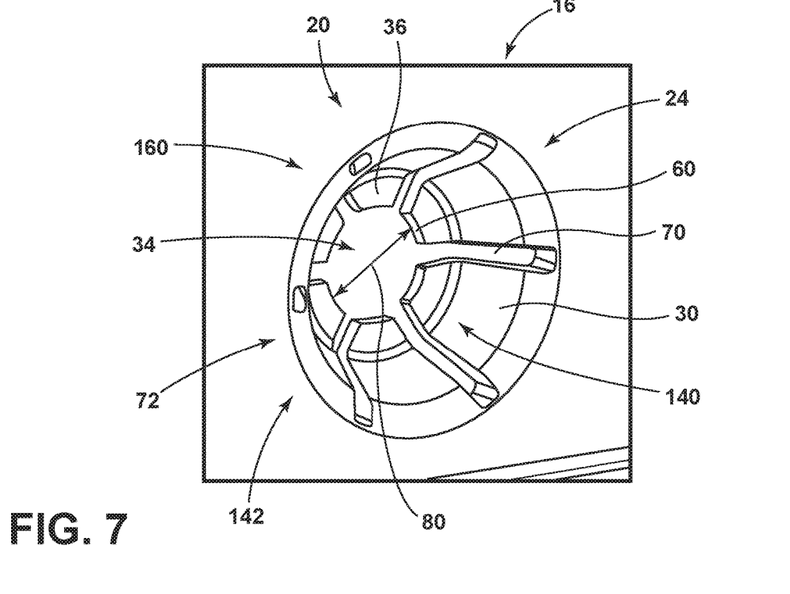
FIG. 7 is an enlarged perspective view of the substrate receptacle of FIG. 6 taken at area VII.
Figure 8:
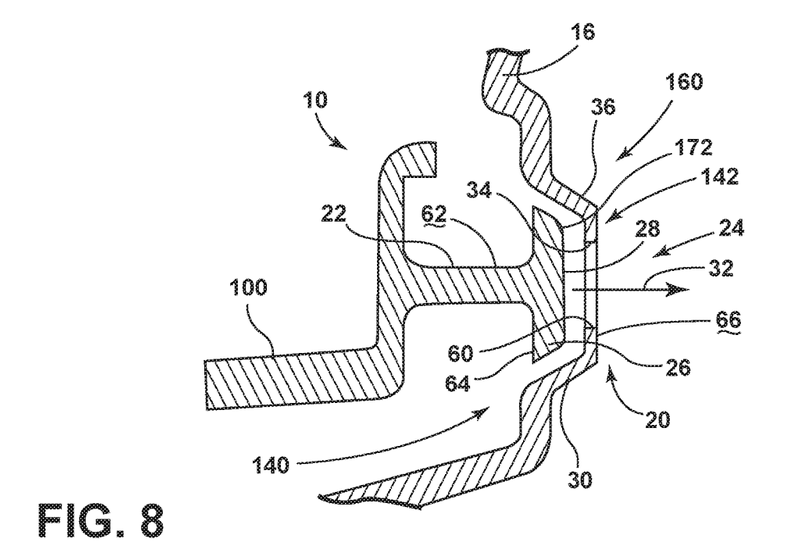
FIG. 8 is a cross-sectional view of an aspect of the armrest substrate moving toward engagement with the substrate receptacle of the inner door liner.
Figure 9:
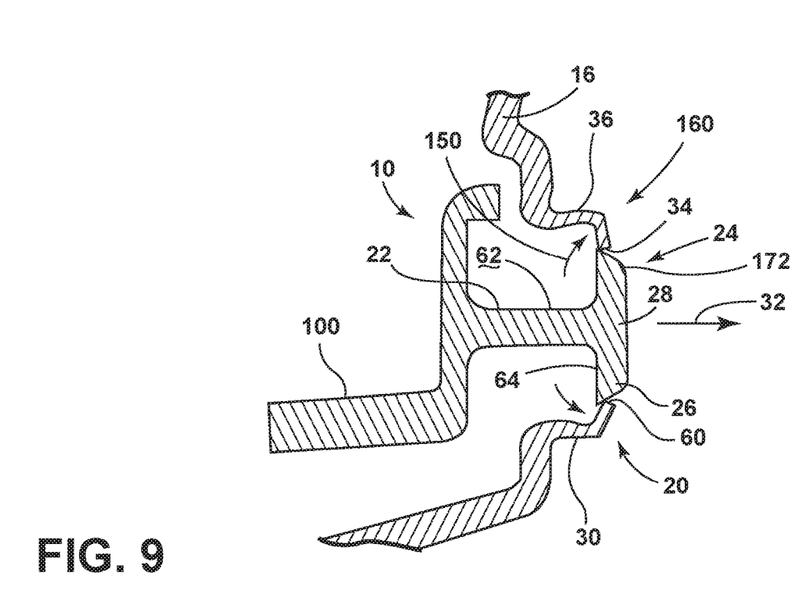
FIG. 9 is a cross-sectional view of the assembly of FIG. 8 showing the retaining features engaging the angled flanges of the substrate receptacle to allow passage of the retaining feature.
Figure 10:
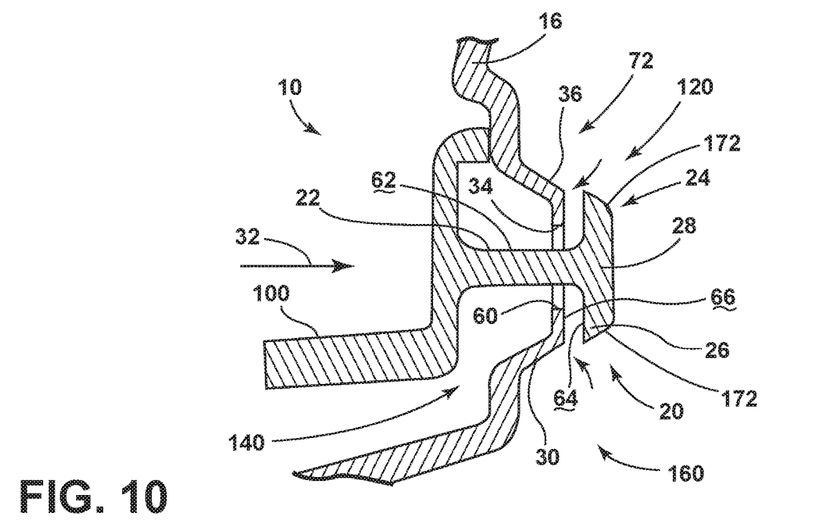
FIG. 10 is a cross-sectional view of the armrest substrate of FIG. 9 showing installation of the armrest substrate into an installed position that allows for movement of the angled flanges back to a securing position.
Figure 11:
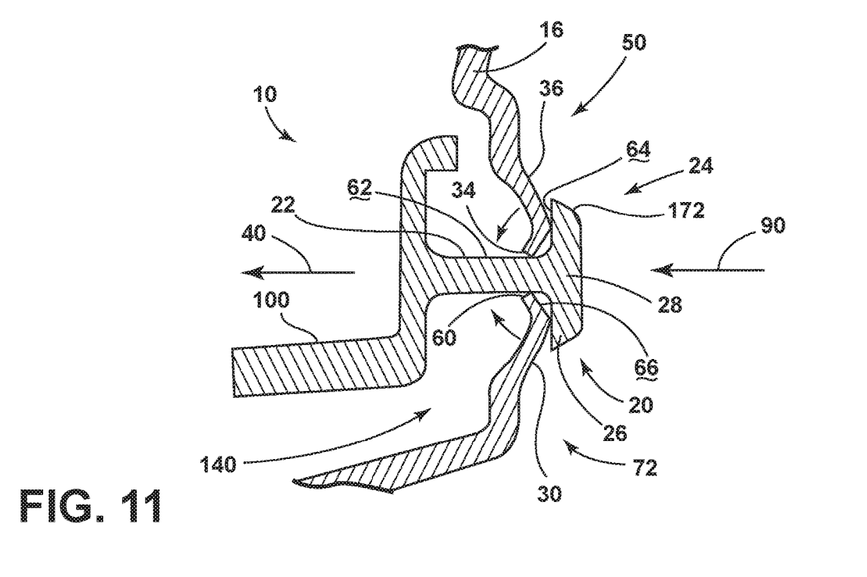
FIG. 11 is a cross-sectional view of the armrest substrate of FIG. 10 and showing operation of the angled flanges at preventing movement of the retaining feature away from the secured position.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As exemplified in FIGS. 1-11, reference numeral 10 generally refers to an armrest substrate that is configured for attachment to a structural portion of a door 12 for a vehicle 14, such as an inner door liner 16 or an inner frame member 18 for securing the armrest substrate 10 to the door 12 of the vehicle 14. According to various aspects of the device, the door 12 can include the inner door liner 16 having a substrate receptacle 20. The armrest substrate 10 includes a plurality of posts 22 that extend through the inner door liner 16 at the substrate receptacle 20. The substrate receptacle 20 includes a plurality of one-way apertures 24 that receives the plurality of posts 22, respectively. Integral retaining features 26 positioned at ends 28 of each of the posts 22 maintain engagement of each post 22 within each respective one-way aperture 24. Each one-way aperture 24 of the plurality of one-way apertures 24 includes at least one angled flange 30. This angled flange 30 is configured to flex in an insertion direction 32, which is typically outward from a central aperture 34 of the angled flange 30. This flexion of the angled flange 30 in the insertion direction 32 allows for the one-way aperture 24 to receive the integral retaining feature 26 of a respective post 22.

Typically, the angled flange 30 of the one-way aperture 24 includes a plurality of radial flanges 36 that are adapted to flex in the insertion direction 32. When the radial flanges 36 are flexed in the insertion direction 32, these radial flanges 36 are biased back toward a securing position 38 to at least partially surround the post 22 for the armrest substrate 10. In this securing position 38, the radial flanges 36 are adapted to prevent outward movement of the posts 22 and the integral retaining features 26 away from the installed position 120 and in a direction opposite of the insertion direction 32. In this manner, the plurality of radial flanges 36 are positioned and angled to resist deflection in a removal direction 40 such that the plurality of radial flanges 36 resists removal of the retaining features 26 from the securing position 38.

Referring again to FIGS. 1-11, use of the retaining posts 22 that include the integral retaining features 26 is intended to securely attach the armrest substrate 10 to the substrate receptacle 20 of the inner door liner 16. Through the engagement of the retaining posts 22 and the integral retaining features 26 extending through the one-way apertures 24 of the substrate receptacle 20, additional fasteners and fastening methods and mechanisms are not typically needed to secure or couple the armrest substrate 10 in the securing position 38. In this manner, screws, bolts, adhesives, welding methods, and other similar fastening methods and mechanisms are not typically needed to secure the armrest substrate 10 to the substrate receptacle 20. By substantially eliminating the need for these additional fastening mechanisms and methods, the process for installing the armrest substrate 10 with the substrate receptacle 20 is less costly and more efficient. Specifically, attaching the armrest substrate 10 to the substrate receptacle 20 is in the form of a single linear-movement operation in the insertion direction 32 to place the various posts 22 in the respective one-way apertures 24 of the substrate receptacle 20. Due to the angled configuration of the radial flanges 36 of the one-way apertures 24, movement of the integral retaining features 26 in the removal direction 40 from the securing position 38 is substantially prevented.

According to various aspects of the device, when the posts 22 and integral retaining features 26 of the armrest substrate 10 are placed in the securing position 38, the armrest substrate 10 is substantially non-removable from this securing position 38. In this manner, when a vehicle 14 experiences an impact condition 50, such as a side-impact, deflection of various portions of the inner door liner 16 and inner frame member 18 will typically not result in removal of the armrest substrate 10 from the substrate receptacle 20. Additionally, the integral nature of the posts 22 with the body 100 of the armrest substrate 10 allows for a collapsing or deflecting operation of the armrest substrate 10 to occur without the armrest substrate 10 detaching from the substrate receptacle 20 of the inner door liner 16.

Referring again to FIGS. 3 and 8-10, when the armrest substrate 10 is in the securing position 38, movement of the armrest substrate 10 away from the securing position 38 results in an abutting engagement between the inner perimeter 60 of the radial flanges 36 with an outer surface 62 of the respective post 22 that is disposed within the respective one-way aperture 24. This configuration is exemplified in FIG. 11. A rear surface 64 of the integral retaining feature 26 abuts against an outward surface 66 of the radial flanges 36. The radial flanges 36 are then deflected inward through this engagement so that the inner perimeter 60 of the radial flanges 36 abuts against an outer surface 62 of the post 22, and prevents further inward movement of the radial flanges 36. This configuration of deflecting members during a movement of the post 22 in a removal direction 40 substantially prevents removal of the armrest substrate 10 from the substrate receptacle 20.

In an impact condition 50, the post 22 and integral retaining features 26 of the armrest substrate 10 cooperatively engage the radial flanges 36 and angled members of the one-way apertures 24 to retain the post 22 and integral retaining features 26 within the securing position 38. Through this configuration, the post 22 and integral retaining feature 26 can be removed from the corresponding one-way aperture 24, typically only through breakage of the inner door liner 16 at the substrate receptacle 20.

Referring again to FIGS. 1-10, the angled flanges 30 of the one-way apertures 24 are typically in the form of a generally conical member 72 or frusto-conical member having a plurality of flexion slots 70. These flexion slots 70 separate the conical member 72 into the radial flanges 36 that are disposed at the predetermined angle that extends in the general direction of the insertion direction 32. The radial members that are defined by the deflection slots permit operation of the conical member 72 to deflect in an insertion direction 32 that is typically away from a central aperture 34 of the conical member 72. The plurality of flexion slots 70 are positioned to also resist movement of the posts 22 and retaining features 26 in a removal direction 40. As discussed previously, the removal direction 40 is generally opposite to the insertion direction 32. Additionally, the removal direction 40, as discussed above, typically results in an inner perimeter 60 of the radial flanges 36 abutting against the outer surface 62 of the post 22 for the armrest substrate 10.

Referring again to FIGS. 3-10, the angled flange 30 or angled flanges 30 of the one-way aperture 24 includes a central aperture 34 that surrounds the respective post 22 in the securing position 38. According to various aspects of the device, this central aperture 34 can include a diameter 80 that is substantially similar to or equal to a thickness 82 of the respective post 22. It is also contemplated that the diameter 80 of the central aperture 34 can be slightly larger than the thickness 82 of the post 22. In other aspects of the device, the central aperture 34 can have a diameter 80 that is smaller than the thickness 82 of the respective post 22. In such an embodiment, the securing position 38 of the armrest substrates 10 results in the inner perimeter 60 of the angled flanges 30 exerting a continual inward force against the outer surface 62 of the post 22. In this manner, when the post 22 and integral retaining feature 26 are moved in the removal direction 40, little if any deflection of the radial flanges 36 will occur.

According to various aspects of the device, it is typical that the diameter 80 of the central aperture 34 of the radial flanges 36 will be at least slightly larger than the thickness 82 of the post 22. In such a configuration, when the post 22 and integral retaining features 26 are moved in the removal direction 40, radial flanges 36 will experience a minimal amount of deflection in the removal direction 40. This minimal amount of deflection can be advantageous in absorbing at least part of the impact force 90 exerted upon the vehicle door 12 during an impact condition 50. External impact forces 90 that may be absorbed through the deflection of the radial flanges 36 can be absorbed within the armrest substrate 10 and the substrate receptacle 20.

Referring again to FIGS. 3-10, the posts 22 of the armrest substrate 10 are integrally formed as part of the armrest substrate 10. In various aspects of the device, the plurality of posts 22 along with the integral retaining features 26 are injection molded as a single member during formation of the armrest substrate 10. Accordingly, a plurality of posts 22, the integral retaining features 26 and the body 100 of the armrest substrate 10 are a single and integral piece that can be installed into the substrate receptacle 20 of the inner door liner 16. This construction can serve to minimize the number of parts and also minimize assembly steps in manufacturing the armrest for a vehicle 14.

According to various aspects of the device, the body 100 of the armrest substrate 10 can include a central gap 110. An armrest structure 112, such as a collapsible structure, can be disposed within the central gap 110 of the body 100 for the armrest substrate 10. Accordingly, during manufacture of the vehicle door 12, the armrest substrate 10 can be attached to the substrate receptacle 20. This operation can be performed with or without the armrest structure 112 disposed within the central gap 110 of the armrest substrate 10. Stated another way, the armrest structure 112 can be disposed within the central gap 110 either before or after the armrest substrate 10 is attached to the substrate receptacle 20.

According to various aspects of the device, the armrest structure 112 can include various collapsing features that maintain the integrity of the central gap 110 during typical operation of the vehicle 14. During an impact condition 50, the armrest structure 112 is adapted to collapse in a substantially predetermined fashion to absorb various external impact forces 90. The use of the armrest substrate 10 in conjunction with the armrest structure 112 is enhanced through the engagement of the armrest substrate 10 with the substrate receptacle 20 being free of additional fasteners. Because no additional fasteners are included in the attachment between the armrest substrate 10 and the substrate receptacle 20, fewer apertures are needed between these components that might further weaken the structure of the vehicle door 12.

Referring again to FIGS. 1-11, a vehicle armrest for a vehicle door 12 can include the armrest substrate 10 having a retention post 22 with an integral retaining feature 26 positioned at an end 28 of the retention post 22. The inner door liner 16 includes a one-way aperture 24 that receives the retention post 22 and the integral retaining feature 26. An angled flange 30 of the one-way aperture 24 allows for passage of the integral retaining feature 26 in an insertion direction 32 to an installed position 120 and a securing position 38 of the armrest substrate 10. The angled flange 30 of the one-way aperture 24 also prevents or substantially prevents movement of the retention post 22 and integral retaining feature 26 away from the installed position 120 or the securing position 38.

Referring again to FIGS. 3 and 8-11, the integral retaining feature 26 can include an outer perimeter 170 that has an angled biasing edge 172 that assist in inserting the integral retaining feature 26 through the central aperture 34. The angled biasing edge 172 can slidably engage the radial flanges 36 and bias the radial flanges 36 in the outward direction 150. The angled biasing edge 172 can also serve as a locating device 142 that cooperates with the generally conical shape of the radial flanges 36 and the one-way aperture 24. Typically the conical member 72 protrudes from the inner door liner 16 and extend generally in the insertion direction 32. In this configuration, the inner volume 140 of the locating device 142 is part of the substrate receptacle 20.

Referring again to FIGS. 1-11, the one-way aperture 24 can be part of a plurality of one-way apertures 24 that define a substrate receptacle 20 of the inner door liner 16. The substrate receptacle 20 can also include a recessed portion 130 of the inner door liner 16 that receives the armrest substrate 10. Various deflecting members or reinforcing members 132 can be installed within the armrest receptacle.

Typically, these reinforcing members 132 will extend proximate or between various one-way apertures 24 of the substrate receptacle 20. These reinforcing members 132 can be designed to deflect during an impact condition 50 to at least partially absorb the external impact forces 90 exerted upon the vehicle 14 during the impact condition 50.

According to various aspects of the device, the material of the armrest substrate 10 can be a substantially plastic material that is at least partially flexible to deflect during an impact condition 50. Accordingly, when portions of the inner door liner 16 deflect as a result of the impact condition 50, the armrest substrate 10 can deflect in kind due to its material properties. By deflecting along with the inner door liner 16, the armrest substrate 10 can remain substantially engaged with the substrate receptacle 20 during the impact condition 50. Accordingly, the armrest substrate 10 remains engaged or substantially engaged with the substrate receptacle 20 and the remainder of the inner door liner 16 during the impact condition 50.

Referring again to FIGS. 1-11, the retention post 22 of the armrest substrate 10 is typically one of a plurality of retention posts 22 that correspondingly engage the plurality of one-way apertures 24 of the substrate receptacle 20 to define the installed position 120 or the securing position 38. The installed position 120 can be defined by a full insertion of the retention post 22 extending through the inner door line 16 at the one-way aperture 24. This configuration is exemplified in FIG. 10.

Referring now to FIGS. 1-12, having described various aspects of the armrest substrate 10 and the substrate receptacle 20 of the inner door liner 16, a method 400 is disclosed for installing a vehicle armrest relative to a vehicle door 12. According to the method 400, the armrest substrate 10 is positioned proximate a substrate receptacle 20 of the inner door liner 16 (step 402). As discussed previously, the armrest substrate 10 includes the retaining posts 22 having the integral retaining features 26 disposed at an end 28 of each retaining post 22.

Referring again to FIGS. 3 and 8-12, during installation of the armrest substrate 10 with the substrate receptacle 20, the integral retaining features 26 are moved into a position within an inner volume 140 of the radial flanges 36 of the one-way aperture 24. In this manner, the inner volume 140 of the radial flanges 36 can act as a locating device 142 for positioning the integral retaining features 26 for installation of the armrest substrate 10. Typically, a plurality of integral retaining features 26 will be aligned with the corresponding plurality of one-way apertures 24. This locating defined by the biasing edge 172 of the retaining feature 26 and the radial flanges 36 provides an installer with at least some feedback regarding the proper or improper positioning of the armrest substrate 10 with respect to the substrate receptacle 20.

Figure 12:
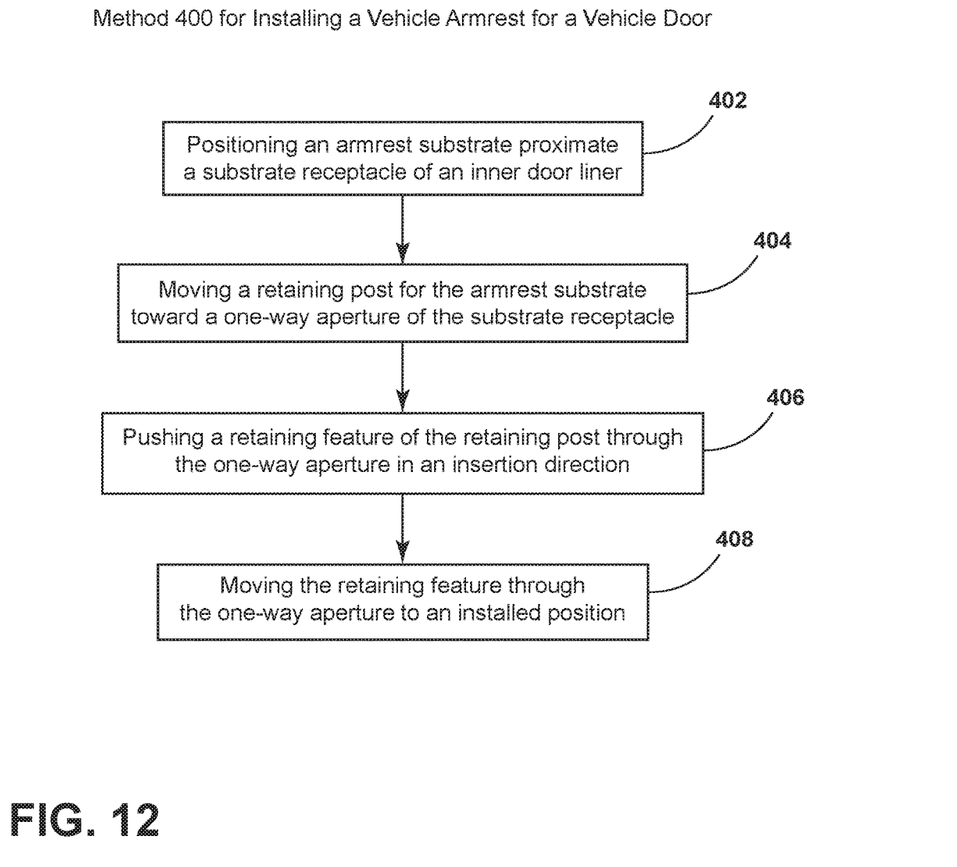
FIG. 12 is a linear flow diagram illustrating a method of installing a vehicle armrest within a vehicle door.

According to the method 400, the retaining posts 22, once in an aligned position, are moved toward a respective one-way aperture 24 of the substrate receptacle 20 (step 404). The integral retaining features 26 of the retaining posts 22 are then pushed through the respective one-way apertures 24 in the insertion direction 32 (step 406).

Pushing or other similar movement of the biasing edge 172 of the integral retaining features 26 of the retaining posts 22 through the one-way apertures 24 serve to bias the radial flanges 36 of the respective one-way aperture 24 in a generally outward direction 150 to expand the central aperture 34. This biasing of the radial flanges 36 allows for clearance for the integral retaining features 26 to pass through the enlarged central opening of the one-way apertures 24. Because the integral retaining features 26 bias the radial flanges 36 in the outward direction 150, the central aperture 34 elastically expands to allow for passage of the integral retaining feature 26 therethrough.

Referring again to FIGS. 1-12, according to the method 400, the retaining post 22 and the integral retaining features 26 are then moved through the respective one-way aperture 24 to an installed position 120 (step 408). In the installed position 120, the armrest substrate 10 is moved fully through the various one-way apertures 24. This configuration is exemplified in FIG. 10. In the installation position, the integral retaining feature 26 can be offset from the radial flanges 36 to allow for deflection of radial flanges 36 back in a generally inward direction and into a rest position 160 surrounding the retaining post 22. After being moved into the installation position, the armrest substrate 10 can then be moved rearward to the securing position 38, which is exemplified in FIG. 3. In the securing position 38, the integral retaining feature 26 is typically in an abutting engagement with the outward surface 66 of the various radial flanges 36 of the one-way aperture 24. In the securing position 38, the body 100 of the armrest substrate 10 is typically offset from the inner door liner 16 at the substrate receptacle 20.

According to various aspects of the device, the armrest substrate 10 and substrate receptacle 20 configuration can be utilized within various components of the vehicle 14. These components can include, but are not limited to, vehicle door armrests, stationary armrests in rear seating positions, and other armrest configurations.

According to various aspects of the device, the integral retaining feature 26 can have several configurations. Such configurations can include, but are not limited to, disc-shaped features, rectilinear features, spherical features, triangular or cylindrical features, irregularly-shaped features, combinations thereof, and other similar retaining configurations. The design of the integral retaining feature 26 is meant to provide an enlarged portion at the end 28 of the retaining post 22 to allow for insertion of the armrest substrate 10 into the substrate receptacle 20. At the same time, the integral retaining feature 26 is designed to prevent separation of the armrest substrate 10 from the substrate receptacle 20 during an impact condition 50, and also during typical use of the vehicle 14. Additionally, the number of retaining posts 22 disposed within the armrest substrate 10 can vary depending upon the design of the particular armrest and the design of a particular vehicle 14 being used. Where more retaining force between the armrest substrate 10 and substrate receptacle 20 is needed, additional retaining posts 22 can be included within the armrest substrate 10.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle door comprising:
   an inner door liner having a substrate receptacle; and
   an armrest substrate having a plurality of posts extending through the inner door liner at the substrate receptacle; wherein
   the substrate receptacle has a plurality of one-way apertures that receive the plurality of posts, respectively; and integral retaining features positioned at an end of each post maintains engagement of each post within each respective one-way aperture.

2. The vehicle door of claim 1, wherein each one-way aperture of the plurality of one-way apertures includes at least one angled flange that is adapted to flex in an insertion direction to receive the integral retaining feature of a respective post.

3. The vehicle door of claim 2, wherein the at least one angled flange includes a plurality of radial flanges that flex in the insertion direction.

4. The vehicle door of claim 3, wherein the plurality of radial flanges are positioned to resist flexion in a removal direction.

5. The vehicle door of claim 4, wherein flexion of the plurality of radial flanges in the removal direction causes abutting engagement between the plurality of radial flanges with the respective post disposed within the one-way aperture.

6. The vehicle door of claim 2, wherein the at least one angled flange is a generally conical member having a plurality of flexion slots that permit operation of the conical member in an insertion direction, wherein the plurality of flexion slots are positioned to resist movement in a removal direction, wherein the removal direction is generally opposite to the insertion direction.

7. The vehicle door of claim 2, wherein the at least one angled flange includes a central aperture that surrounds the respective post.

8. The vehicle door of claim 7, wherein the central aperture has a diameter that is substantially equal to a thickness of the respective post.

9. The vehicle door of claim 1, wherein the plurality of posts are integrally formed as part of the armrest substrate.

10. The vehicle door of claim 9, wherein the plurality of posts and the armrest substrate are injection molded as a single member.

11. The vehicle door of claim 1, wherein the armrest substrate includes a central gap, and wherein an armrest structure is disposed within the central gap of the armrest substrate.

12. The vehicle door of claim 1, wherein the armrest substrate is coupled to the substrate receptacle free of additional fasteners.

13. A vehicle armrest comprising:
an armrest substrate having a retention post with a retaining feature positioned at an end thereof;
an inner door liner having a one-way aperture that receives the retention post;
an angled flange of the one-way aperture that allows passage of the retaining feature in an insertion direction to an installed position and prevents movement of the retaining feature away from the installed position.

14. The vehicle armrest of claim 13, wherein the one-way aperture is part of a plurality of one-way apertures, wherein the plurality of one-way apertures define a substrate receptacle of the inner door liner.

15. The vehicle armrest of claim 14, wherein the retention post is one of a plurality of retention posts that correspondingly engage the plurality of one-way apertures to define the installed position.

16. The vehicle armrest of claim 15, wherein the installed position is defined by the plurality of retention posts engaging the plurality of one-way apertures, respectively, wherein the installed position is free of additional fasteners.

17. The vehicle armrest of claim 13, wherein the angled flange is a generally conical member having a plurality of flexion slots that permit operation of the conical member in the insertion direction, wherein the plurality of flexion slots are positioned to resist movement of the conical member in a removal direction, wherein the removal direction is generally opposite to the insertion direction.

18. The vehicle armrest of claim 17, wherein the angled flange includes a central aperture that surrounds the retention post.

19. A method of installing a vehicle armrest, the method comprising steps of:
positioning an armrest substrate having a retaining post proximate a substrate receptacle of an inner door liner;
moving the retaining post toward a respective one-way aperture of the substrate receptacle;
pushing a retaining feature through the one-way aperture in an insertion direction, wherein movement of the retaining feature through the one-way aperture biases radial flanges of the respective one-way aperture in a generally outward direction; and
moving the retaining feature through the respective one-way aperture to an installed position, wherein the radial flanges in the installed position are biased in a generally inward direction and toward the retaining post.

20. The method of claim 19, wherein the radial flanges are defined by a plurality of flexion slots defined within a generally conical member and wherein the conical member protrudes from the inner door liner in the insertion direction.

* * * * *